US011676252B2

(12) United States Patent
Burke et al.

(10) Patent No.: US 11,676,252 B2
(45) Date of Patent: Jun. 13, 2023

(54) IMAGE PROCESSING FOR REDUCING ARTIFACTS CAUSED BY REMOVAL OF SCENE ELEMENTS FROM IMAGES

(71) Applicant: Unity Technologies SF, San Francisco, CA (US)

(72) Inventors: Sebastian R. F. Burke, Wellington (NZ); Pravin P. Bhat, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 26 days.

(21) Appl. No.: 17/018,960

(22) Filed: Sep. 11, 2020

(65) Prior Publication Data
US 2021/0241422 A1 Aug. 5, 2021

Related U.S. Application Data

(60) Provisional application No. 62/968,593, filed on Jan. 31, 2020.

(51) Int. Cl.
*G06T 5/00* (2006.01)
*G06T 3/00* (2006.01)
*G06T 5/50* (2006.01)
*G06T 7/30* (2017.01)

(52) U.S. Cl.
CPC ............ *G06T 5/005* (2013.01); *G06T 3/0093* (2013.01); *G06T 5/50* (2013.01); *G06T 7/30* (2017.01); *G06T 2207/20221* (2013.01)

(58) Field of Classification Search
CPC ................. G06T 5/005; G06T 7/30–38; G06T 3/0093; G06T 2207/20021; G06T 5/50; G06T 5/21; G06T 2207/10016
See application file for complete search history.

(56) References Cited

U.S. PATENT DOCUMENTS

| | | |
|---|---|---|
| 6,057,859 A | 5/2000 | Handelman |
| 9,336,602 B1 | 5/2016 | Chang |
| 9,378,575 B1 | 6/2016 | Talbot et al. |
| 9,392,264 B1 | 7/2016 | Chang |
| 9,582,928 B2 | 2/2017 | Cho |
| 9,947,108 B1 | 4/2018 | Chen |
| 10,825,148 B2 | 11/2020 | Tagra |
| 2002/0191109 A1 | 12/2002 | Kriegman |
| 2004/0264806 A1 | 12/2004 | Herley |
| 2006/0257042 A1 * | 11/2006 | Ofek .................. G06T 5/50 382/255 |

(Continued)

FOREIGN PATENT DOCUMENTS

| | | |
|---|---|---|
| GB | 2568278 | 5/2019 |
| WO | WO-2018/146558 A2 | 8/2018 |

(Continued)

OTHER PUBLICATIONS

Rittler, Thomas. Depth-guided disocclusion inpainting for temporal consistent virtual view synthesis. Diss. 2014. (Year: 2014).*

(Continued)

*Primary Examiner* — Geoffrey E Summers
(74) *Attorney, Agent, or Firm* — Trellis IP Law Group, PC

(57) ABSTRACT

An image processor eliminates a character or object from a sequence of frames and then merges the resulting images with those of nearby frames, both preceding and succeeding, to synthesize the background of the sequence of frames.

10 Claims, 10 Drawing Sheets

(56) References Cited

U.S. PATENT DOCUMENTS

| | | |
|---|---|---|
| 2009/0003702 A1 | 1/2009 | Ofek |
| 2010/0060793 A1 | 3/2010 | Oz |
| 2011/0293142 A1 | 12/2011 | Van Der Mark |
| 2012/0045095 A1 | 2/2012 | Tate |
| 2012/0314077 A1 | 12/2012 | Clavenna, II |
| 2013/0128121 A1* | 5/2013 | Agarwala ............ G11B 27/031 348/E5.077 |
| 2014/0002591 A1* | 1/2014 | Wenxiu .................. G06T 5/005 348/42 |
| 2015/0097827 A1 | 4/2015 | Reidhaar |
| 2016/0253809 A1 | 9/2016 | Cole |
| 2016/0314593 A1 | 10/2016 | Metzler |
| 2016/0335748 A1 | 11/2016 | Newson |
| 2017/0289623 A1 | 10/2017 | Bailey |
| 2017/0294006 A1 | 10/2017 | Cabral |
| 2017/0359523 A1 | 12/2017 | Rubinstein |
| 2018/0089903 A1 | 3/2018 | Pang |
| 2018/0189974 A1 | 7/2018 | Clark et al. |
| 2018/0336669 A1 | 11/2018 | Mertens |
| 2018/0350136 A1 | 12/2018 | Rowley |
| 2019/0295227 A1 | 9/2019 | Wang |
| 2020/0019921 A1 | 1/2020 | Buibas |
| 2020/0118594 A1 | 4/2020 | Oxholm |
| 2020/0286284 A1 | 9/2020 | Grabli |
| 2021/0042950 A1 | 2/2021 | Wantland |
| 2021/0056668 A1* | 2/2021 | Barnes .................... G06T 5/005 |

FOREIGN PATENT DOCUMENTS

| | | |
|---|---|---|
| WO | WO-2019/079752 A1 | 4/2019 |
| WO | PCT/NZ2020/050113 | 9/2020 |
| WO | PCT/NZ2020/050114 | 9/2020 |
| WO | PCT/NZ2021/050008 | 1/2021 |
| WO | PCT/NZ2021/050020 | 2/2021 |

OTHER PUBLICATIONS

Ma, Wenjuan, and Maolin Hu. "Image inpainting under different displacement view images." MIPPR 2007: Automatic Target Recognition and Image Analysis; and Multispectral Image Acquisition. vol. 6786. International Society for Optics and Photonics, 2007. (Year: 2007).*

Bodensteiner, Christoph, et al. "Monocular camera trajectory optimization using LiDAR data." 2011 IEEE International Conference on Computer Vision Workshops (ICCV Workshops). IEEE, 2011. (Year: 2011).*

Hartley, Richard, and Andrew Zisserman. Multiple View Geometry in Computer Vision. Cambridge University Press. (Year: 2004).*

Szeliski, Richard. Computer Vision: Algorithms and Applications. Springer. (Year: 2011).*

Ilan, Shachar, and Ariel Shamir. "A Survey on Data-Driven Video Completion." Computer Graphics Forum. vol. 34. No. 6. 2015. (Year: 2015).*

Mishra, Anima, Bishwajit Sharma, and Subrata Rakshit. "High Fidelity Inpainting for Critical Applications Using Image Fusion." 2007 International Conference on Computing: Theory and Applications (ICCTA'07). IEEE, 2007. (Year: 2007).*

Bai, Jiamin, et al. "User-Assisted Video Stabilization." Computer Graphics Forum. vol. 33. No. 4. 2014. (Year: 2014).*

Granados, Miguel, et al. "How not to be seen—object removal from videos of crowded scenes." Computer Graphics Forum. vol. 31. No. 2pt1. Oxford, UK: Blackwell Publishing Ltd, 2012. (Year: 2012).*

Hao, Chuanyan, and Enhua Wu. "Interactive image completion with perspective constraint." Proceedings of the 11th ACM SIGGRAPH International Conference on Virtual-Reality Continuum and its Applications in Industry. 2012. (Year: 2012).*

Matsushita, Yasuyuki, et al. "Full-frame video stabilization with motion inpainting." IEEE Transactions on pattern analysis and Machine Intelligence 28.7 (2006): 1150-1163. (Year: 2006).*

Ebdelli, Mounira, Olivier Le Meur, and Christine Guillemot. "Video inpainting with short-term windows: application to object removal and error concealment." IEEE Transactions on Image Processing 24.10 (2015): 3034-3047. (Year: 2015).*

Matsuyama et al. "Multi-Camera Systems for 3D Video Production." 3D Video and Its Applications. Springer, London, 2012. 17-44. (Year: 2012).

Diego Ortin et al: "Occlusion-Free Image Generation for Realistic Texture Mapping," International Archives of the Photogrammetry. Remote Sensing and Spatial Information Sciences., May 8, 2012 [May 8, 2012], XP055762571, Retrieved From the Internet: URL: http://citeseerx.ist.psu.edu/viewdoc/download?doi=10.1.1.70.9379&rep=repl&typr=pdf.

Jaeho Lee et al: "Removing Foreground Objects by Using Depth Information From Multi-View Images," Proceedings of SPIE, Vol. 6696, Sep. 13, 2007 [Sep. 13, 2007].

Non-Patent Literature; Written Opinion of the International Search Report for International Application No. PCT/NZ2021/050008 Filed Jan. 28, 2021; 9 Pages.

* cited by examiner

IMAGE PROCESSING FOR REDUCING ARTIFACTS CAUSED BY REMOVAL OF SCENE ELEMENTS FROM IMAGES

CROSS REFERENCES TO RELATED APPLICATIONS

This application claims the benefit of U.S. Provisional Patent Application Ser. No. 62/968,593, entitled IMAGE PROCESSING FOR REDUCING ARTIFACTS CAUSED BY REMOVAL OF SCENE ELEMENTS FROM IMAGES, filed on Feb. 28, 2020, which is hereby incorporated by reference as if set forth in full in this application for all purposes.

This application is related to the following applications which are hereby incorporated by, reference as if set forth in full in this application for all purposes:

U.S. Provisional Patent Application Ser. No. 62/968,593, entitled "Image Processing for Reducing Artifacts Caused by Removal of Scene Elements from Images", filed on Jan. 31, 2020, which is hereby incorporated by reference as if set forth in full in this application for all purposes.

U.S. patent application Ser. No. 17/018,933, entitled RECONSTRUCTION OF OBSCURED VIEWS OF CAPTURED IMAGERY USING ARBITRARY CAPTURED INPUTS, filed on Sep. 11, 2020;

U.S. patent application Ser. No. 17/018,943, entitled COMPUTER-GENERATED IMAGE PROCESSING INCLUDING VOLUMETRIC SCENE RECONSTRUCTION, filed on Sep. 11, 2020; and U.S. patent application Ser. No. 17/018,948, entitled RECONSTRUCTION OF OBSCURED VIEWS IN CAPTURED IMAGERY USING PIXEL REPLACEMENT FROM SECONDARY IMAGERY, filed on Sep. 11, 2020.

FIELD OF THE INVENTION

The present disclosure generally relates to computer processing of captured images to modify images from captured scenes. The disclosure relates more particularly to apparatus and techniques for processing imagery to reduce effects of artifacts of live action scenes that have been captured and are modified.

BACKGROUND

Imagery might comprise still images or sequences of images, or frames, that when viewed in sequence, form a video sequence. Imagery might be created using cameras or other devices to capture a live action scene where objects, such as actors, machines, and inanimate objects appear in a stage area that are all physically present in the stage area, which might be an area especially set up for filming or other area. Imagery might comprise, instead of or in addition to live action, computer-generated elements. The computer-generated elements might be represented by geometric models stored in a scene memory to represent objects that are to appear in the imagery but that do not necessarily exist physically.

After creation of imagery from a live action scene, an artist, director, or some operator might want to edit the imagery to effectively remove objects from the imagery. The objects to be removed might be actors, perhaps because of a decision to change how a live action scene appears in a video without having to reshoot the scene, or inanimate objects. If the removed objects are simply replaced by pixels of some color or pixels representing some other object, the replacement might be jarring and unnatural. Thus, there are applications for a visual editing system that can remove objects from captured imagery and provide a seamless, or near seamless, replacement with no artifacts or reduced artifacts. For example, it might be desired that pixels of the imagery that correspond to the object to be removed be replaced with pixels having pixel color values that correspond to whatever objects in the live action scene that were behind and/or obscured by the object being removed.

In some imagery editing systems, removing an object can leave undesirable vestiges of the removed object, with artifacts or ghosting that can distract from the imagery. Improved imagery editing systems might improve upon the object replacement process.

SUMMARY

An image processor, implemented as software and/or hardware, processes images, such as frames of a video sequence, in order to replace or modify pixel values of pixels of one or more frames based on pixel values of pixels in corresponding frame regions of nearby frames that are near in time to a video sequence frame in which pixels are being replaced or modified. Frames might be selected to be a set of nearby frames from which replacement values are computed. For a current frame of a plurality of frames, a pixel of interest, the pixel of interest to be replaced, might be determined and a set of pixels corresponding to the pixel of interest from corresponding frame regions of frames of the set of nearby frames identified. A distribution for the set of pixels might be determined and tested to determine whether the distribution is within a threshold. Where the distribution is within the threshold, a replacement pixel might be obtained. A stitched image can be generated from a current frame, wherein the pixel of interest is replaced with the replacement pixel.

The distribution might be weighted, such as with a Gaussian distribution, a uniform distribution, or the like. A spatially-varying gain might be used that varies over pixels of the second image.

A computer-implemented method for processing digital video might be provided, wherein an input video sequence is represented by a plurality of frames each represented by an array of pixel values, the method comprising determining, for a current frame of the plurality of frames, a region of interest, determining whether the region of interest is to be replaced with a replacement image portion, obtaining, from the plurality of frames, a set of nearby frames, wherein a nearby frame of the set of nearby frames is a frame relative to the current frame having a predetermined time relationship with the current frame in the input video sequence, identifying, from the set of nearby frames, corresponding frame regions, each corresponding frame region corresponding to one nearby frame of the set of nearby frames and being a region of the nearby frame corresponding to the region of interest, determining a distribution for the corresponding frame regions, determining a variance among the corresponding frame regions, and then as a result of determining the variance, determining whether to exclude an excludable corresponding frame region from consideration when it is outside a threshold of the variance and computing, based on the distribution, the variance, and the corresponding frame regions, the replacement image portion. A processed video sequence can be generated wherein the region of interest in the current frame is replaced with the replacement image portion.

The region of interest might comprise one pixel. The replacement image portion might comprise one pixel. The corresponding frame regions might comprise regions of the set of nearby frames and the set of nearby frames comprises at least one hundred prior frames immediately prior in time to the current frame in the input video sequence and at least one hundred subsequent frames immediately following in time to the current frame in the input video sequence.

The corresponding frame regions might be determined to be views of objects present in the region of interest of the current frame. The corresponding frame regions might be a set of corresponding pixels, the region of interest of the current frame might be a current frame pixel, and the set of corresponding pixels might be pixels determined to be colored based at least in part on an object that colors the current frame pixel.

The distribution might be a weighted average of nearby frames of the set of nearby frames wherein a weight of a given nearby frame is a function of a time difference between the current frame and the given nearby frame, with the function being a linear function, a Gaussian distribution function, or some other function.

The method may comprise repeating the computing of the replacement image portion for a plurality of current frames.

A computer system for processing digital video, comprising at least one processor and a computer-readable medium storing instructions, which when executed by the at least one processor, might cause the computer system to (a) determine, for a current frame of a plurality of frames, a pixel of interest, the pixel of interest to be replaced, (b) obtain, from the plurality of frames, a set of nearby frames, (c) identify, from the set of nearby frames, a set of pixels corresponding to the pixel of interest, (d) determine a distribution for the set of pixels, (e) as a result of determining the distribution, determine that the distribution is within a threshold, (f) as a result of determining that the distribution is within the threshold, determine a replacement pixel, and (g) generate a stitched image from the current frame, wherein the pixel of interest is replaced with the replacement pixel.

A non-transitory computer-readable storage medium storing instructions, which when executed by at least one processor of a computer system, might cause the computer system to perform one or more of these methods.

A carrier medium might carry, transmit, and/or store image data that includes pixel values generated according to the methods described herein.

BRIEF DESCRIPTION OF THE DRAWINGS

Various embodiments in accordance with the present disclosure will be described with reference to the drawings, in which.

DETAILED DESCRIPTION

Figure 1:
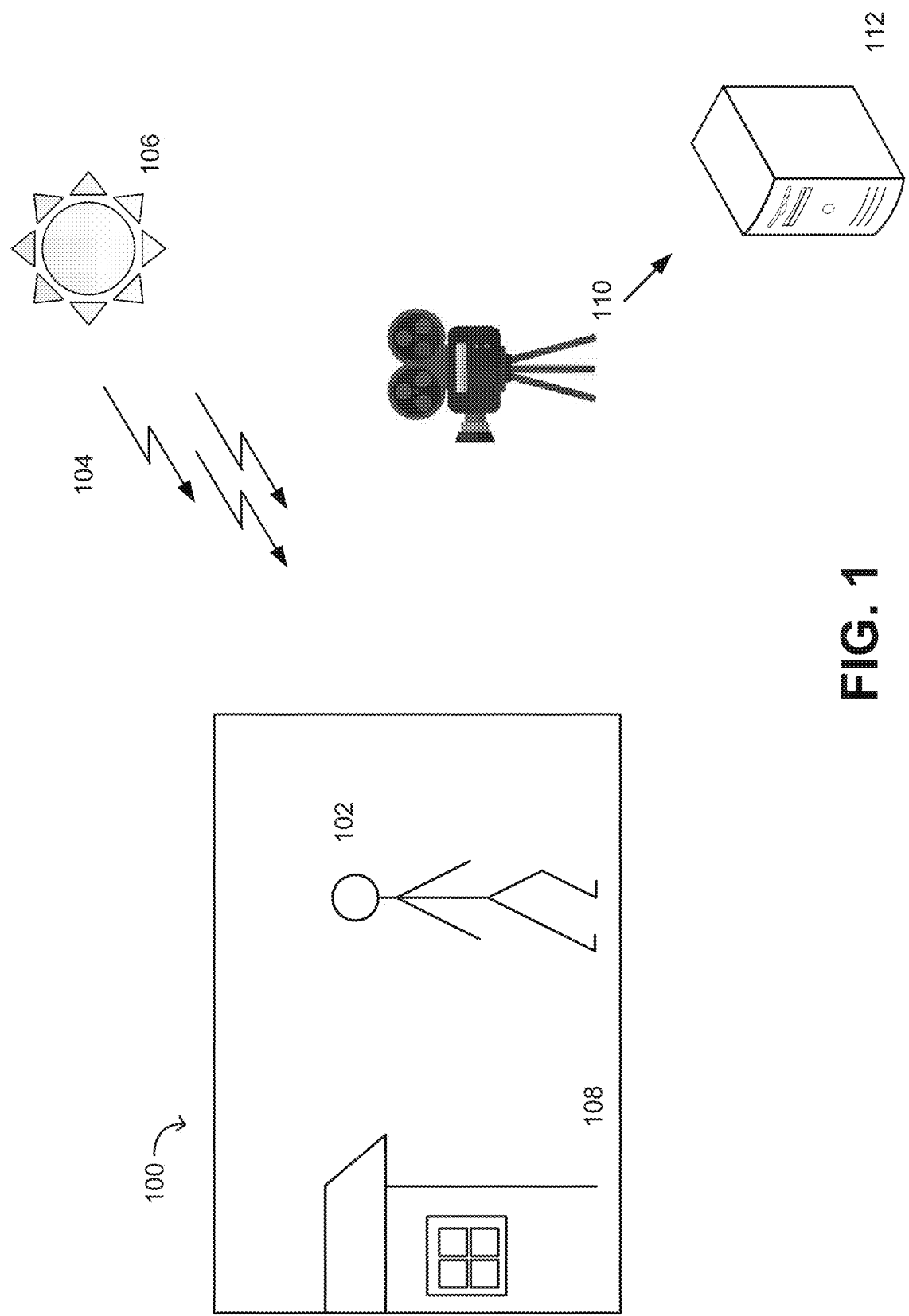
FIG. 1 illustrates an example environment where a plurality of images of a scene are captured and processed to form a stitched image.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques and systems described herein relate to editing captured imagery captured, at least in part, from a live action scene, and to modify that captured imagery in various ways, such as causing it to appear that an object present has been removed from the imagery, while having the resulting imagery appear as if the object was not present when the imagery was captured. When computer-generated imagery (CGI) is incorporated into a video, actors and other objects may need to be edited out of the frames of the video to make room for the CGI. For the pixels of the imagery that correspond to the objects to be removed, they might be replaced with pixels having pixel color values that correspond to what the removed objects obscured, such as a stage background, other objects in the stage, other actors, etc.

In some cases, this might be possible for a human video editor to manually adjust pixel color values to remove an object cleanly, but that can be a time-consuming, tedious, and error prone process. Removing objects from a video on a frame-by-frame basis can require consistency from frame to frame, properly identifying the borders of the object to be removed and then replacing pixel color values. In embodiments described herein, all or part of this process might be automated.

In an image processing system as described herein, images are obtained from one or more cameras, possibly with different camera settings, such as using different exposure times, sensor analog gain (AG), apertures and the like. In some cases, the camera settings are different for different cameras because they may be capturing different portions of a scene that might have different lighting conditions, etc. If distinct camera settings are used over a plurality of images and the images are simply stitched together, there will typically be a visible seam where the images are connected. Using techniques described herein, the stitching can provide a more seamless combined image, while still being an accurate image.

As used herein, "camera exposure" refers to a product of exposure time, sensor analog gain (AG) and aperture, but it should be understood that equivalents of the product might be used in appropriate situations. In a digital camera setting, where an image is captured and represented by an array of pixel color values, the camera exposure can determine what pixel color values are present in a captured image for a given amount of light that would fall on those pixels. A dynamic range of a given digital camera or image capture device relates to what light levels correspond to the range of values from the lowest pixel level to the highest pixel level. As used herein, a scene generally refers to the lighting, background, objects, persons, colors, etc. that is physically present in front of one or more cameras. A scene might have some artificial elements added post-capture, but generally a scene is what is observed by an observer and captured by one or more cameras.

As also used herein, "image registration" refers to a process of aligning two or more images of the same scene. One of the images is referred to as the moving image, or source image, and the others are referred to as the target, fixed, or sensed images. Image registration involves spatially transforming the source/moving image(s) to align with the target image. The reference frame in the target image is stationary, while the other datasets are transformed to match to the target. Images can be misaligned for a variety of reasons. Commonly, images are captured under variable conditions that can change the camera perspective or the content of the scene. Misalignment can also result from lens and sensor distortions or differences between capture devices.

Individual images might be combined to form a combined image. For example, for a motion picture that needs images of a scene possessing high resolution and a wide field of view, the director might use multiple cameras to capture individual images and stitch them together to form a combined image of the scene that can be used for computer vision processing. As used herein, stitching of images can represent various image processing methods wherein an input is a plurality of images of a scene, as well as inputs of the camera parameters of the cameras that captured the plurality of images, and an output may be a stitched image that spans the scene in greater scope than the individual images of the plurality of images.

The processing to generate the stitched image may include processing the plurality of images to reduce the appearance of discontinuities where images are joined. This processing might include image overlaps, wherein some portions of a scene are captured in more than one of the input images. The processing might also include addressing artifacts of image capture that are not normally noticed by viewers but are noticeable when images are placed side by side. An example of this is veiling glare. The processing may be implemented by software executing on a computer system (e.g., a computer system 1000 illustrated in FIG. 10).

The plurality of input images might be captured by a different camera for each different input image, but in other cases, one camera might capture more than one input image of the plurality of input images, such as in the case of where a single camera is moved to capture different parts of a scene to create a panoramic image. The different cameras might not necessarily be located in the same place, yet still their individual images may need to be stitched together to form a combined image.

Moreover, across frames, different values of pixels may need to be assessed so as to pick which frame to use as a source of replacement pixels. For example, if one hundred samples of a particular pixel in adjacent frames have the same value P, there is a good probability that using the value P for the replacement pixel will produce acceptable results. However, if the same one hundred samples have one hundred different values, it may be necessary to look for stability in neighboring pixels, across multiple frames, of the particular pixel of interest. Thus, the corresponding frame regions might comprise regions of the set of nearby frames and the set of nearby frames might comprise at least one hundred prior frames immediately prior in time to the current frame in the input video sequence and at least one hundred subsequent frames immediately following in time to the current frame in the input video sequence. Numbers other than one hundred might be used instead to select nearby frames and corresponding frame regions. A corresponding frame region might be as small as one pixel.

In one scenario for the removal of a character or object from a video, a character or object may be simply removed from the video and the deleted pixels replaced with the background pixels of the background. In another scenario, a character or object might be removed from the video and replaced with another character or object. In the latter scenario, even if the borders of the removed object and the replacement object are the same, replacement of the pixels of the removed object with those of the background can allow a subsequent editor, e.g., a member of the effects (FX) team, to introduce the replacement character without a concern for residual artifacts from the original character or characters. In the present disclosure, unless otherwise indicated, embodiments might treat objects and characters such that a distinction is not made between them.

In the preceding and following description, various techniques are described. For purposes of explanation, specific configurations and details are set forth in order to provide a thorough understanding of possible ways of implementing the techniques. However, it should also be apparent that the techniques described herein may be practiced in different configurations without the specific details. Furthermore, well-known features may be omitted or simplified to avoid obscuring the techniques being described.

Techniques described and suggested herein can be used to improve the field of computing, especially the field of digital animation, by providing a way to edit frames of a video so as to remove characters while avoiding the introduction of artifacts into the frames of a video. Furthermore, a practical application of the present disclosure is a simpler interface and a reduction in time with fewer user inputs to remove characters from a video. Additionally, techniques described and suggested herein can be used to improve efficiency of digital animation systems by removing the need to individually edit the frames of a video, thereby achieving a reduction in storage space, memory space, and rendering time for the set of frames. The techniques may be implemented by software executing on a computer system (e.g., a computer system 1000 illustrated in FIG. 10).

FIG. 1 illustrates an example of frame stitching in accordance with an embodiment. FIG. 1 depicts an example environment where a plurality of images of a scene are captured and processed to form a stitched image. As shown there, a scene 100 is captured using one or more cameras 110. The scene comprises an actor 102, illuminated by light 104 from a light source 106 against a background 108. The one or more cameras may send the footage of the scene to a computer system 112 for subsequent processing. The actor 102 may be moving or stationary. There may be multiple cameras 110 capturing the actor 102 from different angles against the background 108. As a result of the different angles, the cameras may record different lighting conditions and there may be different shadows cast by the actor 102. Furthermore, there may be multiple actors 102 in the scene.

Thus, in an embodiment, the scene 100 may be a digital representation of one or more objects in front of a background. Objects may occlude other objects. The characteristics (e.g., size, position, orientation, color, etc.) of the objects and the layout of scene 100 may be stored in a data structure in memory or other storage.

Each camera 110 may continuously output images, perhaps as a video sequence. The output of camera 110 might be sent to a computer system 112 that does further processing of the stitched image, such as object recognition, storage, broadcasting, printing, etc.

In an embodiment, portions of the background 108 may become occluded as the actor 102 moves about the scene 100. Similarly, the light 104 may vary, resulting in changing shadows behind the actor 102 against the background 108. Consequently, the color values of an individual pixel, as recorded by the camera 110, in the X-Y plane of the scene 100, may vary across a sequence of frames. This variance may occur even for pixels in the background 108 that are never occluded by the actor 102 due to, for example, changing light conditions or camera angles. Specifically, FIG. 1 depicts, in an embodiment, instances of objects (e.g., an actor and a house) with some objects possibly occluding other objects. It should be understood that the scene description might be represented by data in memory that logically corresponds to what is illustrated in FIG. 1.

Figure 2:
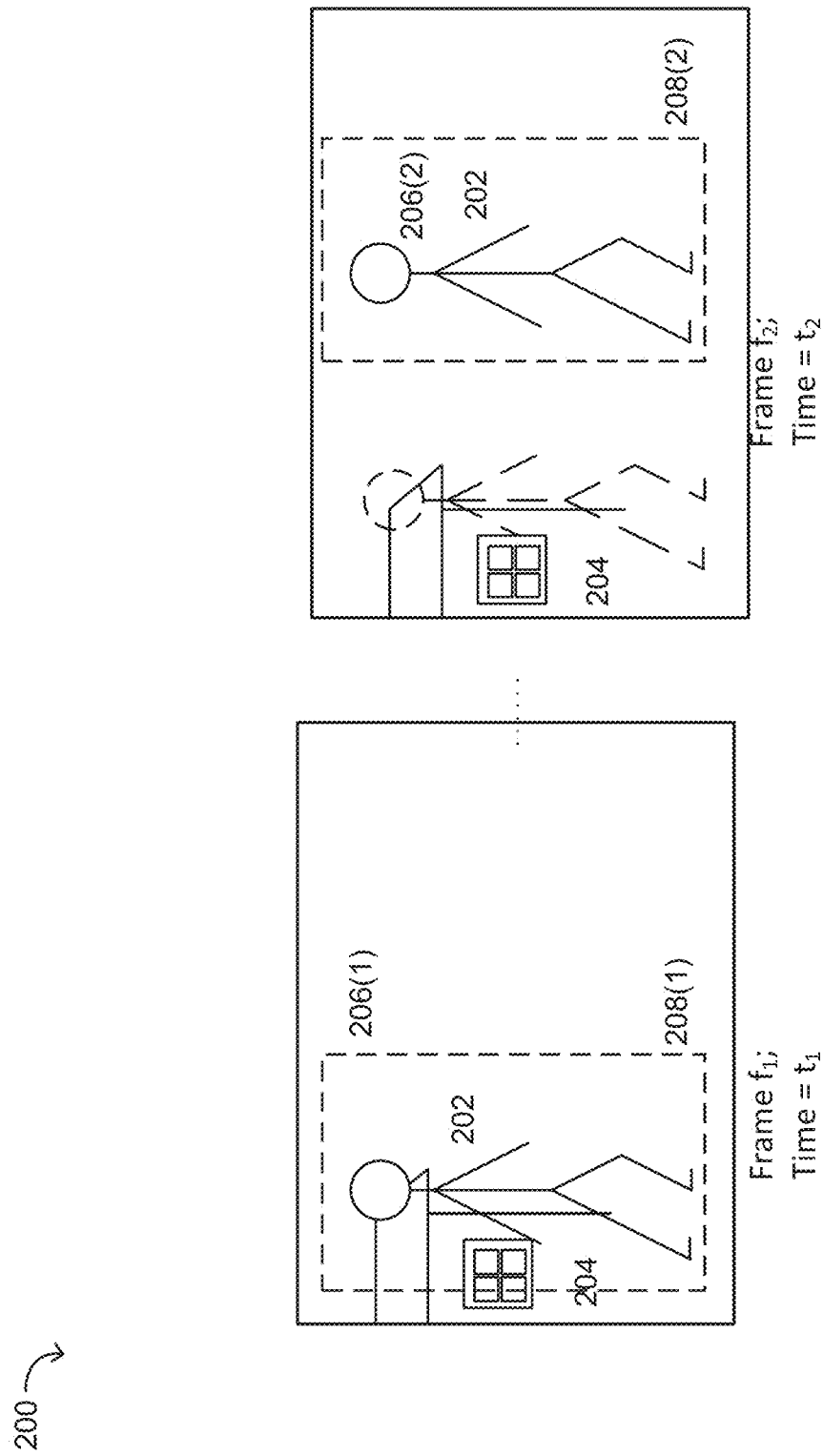
FIG. 2 illustrates an example of the exposure of a background as an actor moves across it as might be used in an image stitching process.

FIG. 2 illustrates an example of an object occluding a background in accordance with an embodiment. Specifically, FIG. 2 illustrates the movement of an actor in two states of a scene, passing in front of a background object. In an initial state, the actor 202 is occluding part of the window and part of the edge of the roof of the house 204. As shown in the first state of the scene 200, frame $f_1$ shows an example of an actor 202 walking, at position 206(1), at a time $t_1$, in front of a background 208(1). At time $t_1$, the actor 202 partially occludes a house 204 in the background 208(1). However, in frame $f_2$, at time $t_2$, in the second state of the scene, the actor 202 has moved to a new position 206(2). At the new position 206(2), the actor has moved to position 206(2) of the background 208(2) such that the house 204 is no longer occluded by the actor 202. These distinct states could represent different times, and thus different frames, of one video sequence.

If, in an embodiment, the pixels representing the actor 202 are removed from frame $f_1$, the resulting frame may require the substitution of pixels from either a preceding or succeeding frame. A preceding or succeeding frame, in which the desired pixels are not occluded, may serve as a source for replacement pixels. There may be many preceding or succeeding frames from which to choose the replacement pixels.

A nearby frame is a frame, possibly preceding, possibly succeeding, that is close enough in the video sequence to a current frame being processed to be useful for use in substitution, perhaps having some predetermined time relationship with the current frame in the input video sequence. For example, if a video sequence shows a person walking on a beach and then a few minutes later pans to show cars driving on a road, a substitution in order to show frames of the beach without the person walking would likely not find value is referring to pixels from frames that are of the road. In some cases, the set of nearby frames that are considered for substitution for a current frame might comprise immediately preceding frames and immediately succeeding frames, just preceding frames, just succeeding frames, and/ or some frames that are further away in time relative to frames that are not included in the set of nearby frames. For example, if a first frame shows an unobstructed object, a second frame shows that object but with a flash of light that is one frame in duration, and the third frame has the object obstructed, reconstruction and pixel replacement for the third frame might use the first frame but not the second frame and so the second frame would not be in the set of nearby frames. In some embodiments, the nearby frames that are considered when processing the current frame are determined by some predetermined and/or stored relationship. An example of such predetermined relationships might be the N frames before and the N frames after the current frame, the third, sixth, and ninth frame before the current frame, or some other pattern. The pattern might be the same for each current frame, or the pattern might be different for different current frames.

In order to replace the pixels in a current frame $f_1$, an embodiment might select the appropriate pixels from frame $f_2$ in the set of nearby frames as illustrated in FIG. 2. In frame $f_2$, the roof and window of the house 204 are no longer occluded. Consequently, the pixels from frame $f_2$, in an embodiment, might serve as a source for replacement. However, visual changes such as lighting, camera angle, and the like might result, in an embodiment, in a different frame being chosen as a better source of replacement pixels.

Figure 3:
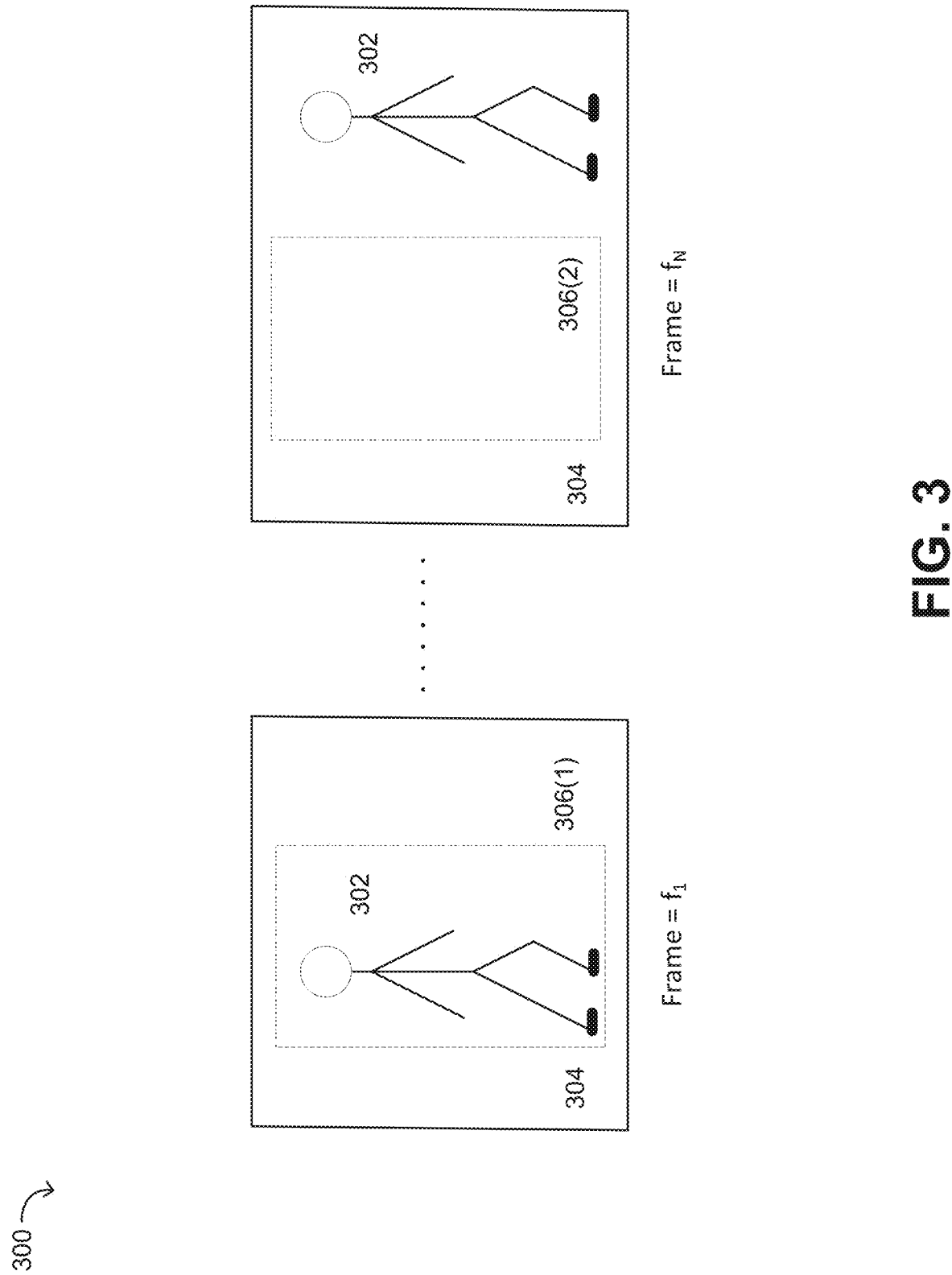
FIG. 3 illustrates an example of an actor exposing a background as they move across it.

FIG. 3 illustrates an example of an object occluding a background in accordance with an embodiment. Specifically, FIG. 3 illustrates two states of a scene 300, in which a camera has captured a sequence of frames comprising a video. In an initial state, an actor 302 at location 306(1) in frame $f_1$ is partially obscuring a background 304 while walking across the scene. As the actor 302 moves, at frame $F_n$ of the video, the previously occluded portion 306(2) of the background 304 becomes visible.

If, in an embodiment, in the second state of the scene, the pixels representing the actor 302 are removed from frame $f_1$, the resulting frame may require the substitution of pixels from either a preceding or succeeding frame. A preceding or succeeding frame, in which the desired pixels are not occluded, may serve as a source for replacement pixels. That there may be many preceding or succeeding frames from which to choose the replacement pixels. The selection of pixels may be implemented by software executing on a computer system (e.g., a computer system 1000 illustrated in FIG. 10).

In order to replace the pixels in frame $f_1$, an embodiment might select the appropriate pixels from frame $F_n$. In frame $F_n$, the portion 306(2) of the background is no longer occluded. Consequently, the pixels from frame $F_n$, in an embodiment, might serve as a replacement source. However, changes in lighting or camera angle might result, in an embodiment, in one or more different frames being chosen as better sources of replacement pixels.

Figure 4:
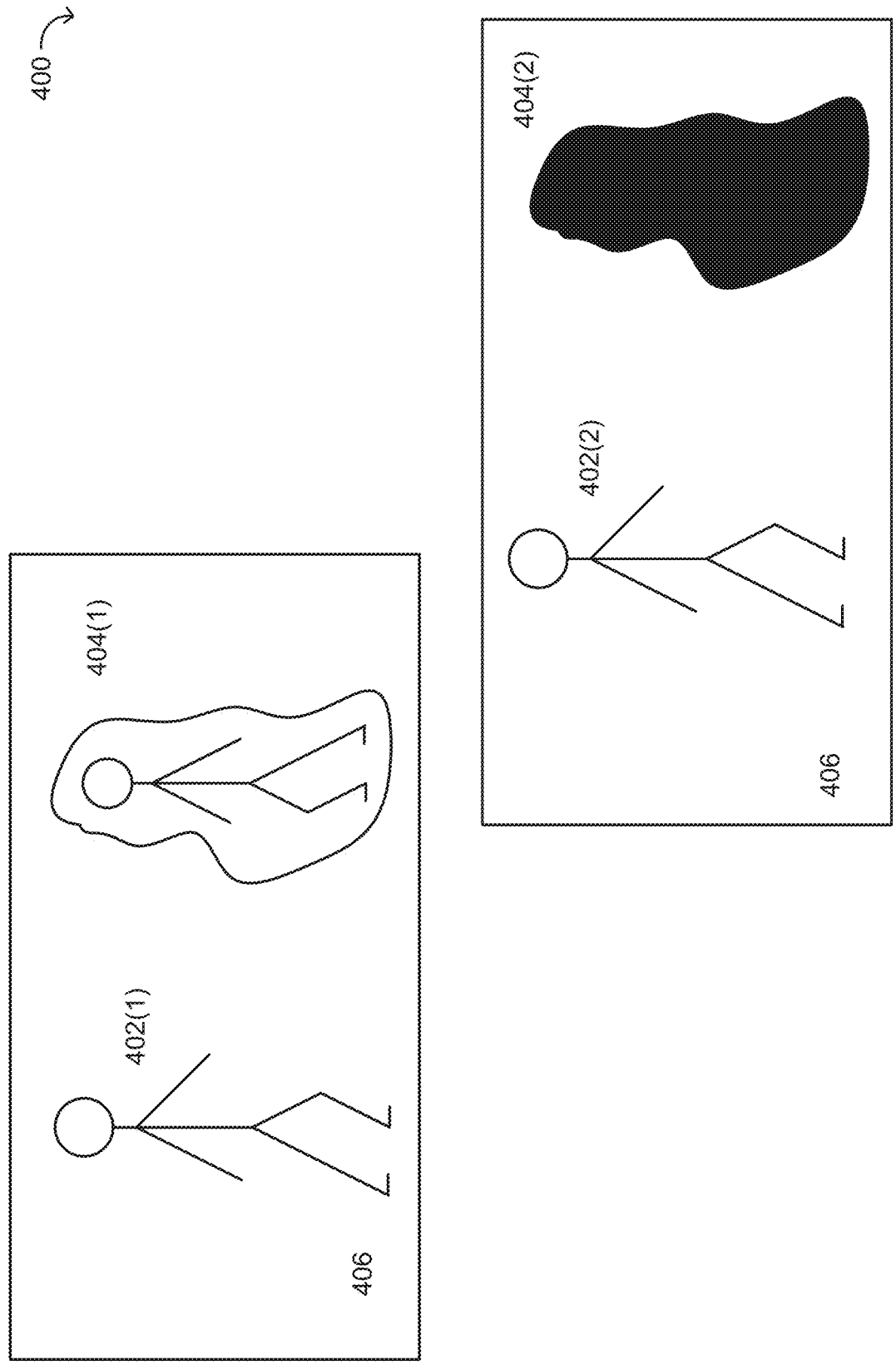
FIG. 4 illustrates an example of an object being selected and labeled for removal from a scene.

FIG. 4 illustrates an example of an object occluding a background, in accordance with an embodiment, being selected for removal from a scene. FIG. 4 illustrates two states of a scene 400, displayed on a computer screen, containing a first actor 402(1) and a second actor 404(1) against a background 406. In the first state of the scene, the second actor 404(1) has been partially selected to be removed from the scene. Using a computer interface, selection may be performed through the use of a mouse, light pen, or other input device.

The second state of the scene illustrates a subsequent step in which the second actor 404(2) has been completely selected for removal from the scene. Removal of the selected area from a frame may result in empty pixels. Consequently, in an embodiment, upon removal from a frame, a preceding or succeeding frame in which the desired pixels are not occluded may serve as a source for replacement pixels.

In an embodiment, in a scene, one, many, or all objects may be selected without a requirement that all selected objects be removed from the scene.

Removal and replacement of pixels, in an embodiment, may involve the application of edge detection. Edge detection includes a variety of mathematical methods that aim at identifying points in a digital image at which the image brightness or color changes sharply or, more formally, has discontinuities. The points at which image brightness or color changes sharply are typically organized into a set of curved line segments termed edges. Discontinuities in image brightness or color may correspond to discontinuities in depth or surface orientation, changes in material properties, or variations in scene illumination. Edge detection may be implemented by software executing on a computer system (e.g., a computer system 1000 illustrated in FIG. 10).

Most methods for edge detection can be grouped into two categories: search-based and zero-crossing based. Search-based methods may detect edges by first computing a measure of edge strength, usually a first-order derivative expression such as the gradient magnitude, and then searching for local directional maxima of the gradient magnitude using a computed estimate of the local orientation of the edge, usually the gradient direction. Zero-crossing based methods may search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, may be applied.

After computing a measure of edge strength (typically the gradient magnitude), the next stage may be to apply a threshold, in order to decide whether edges are present or not at an image point. The lower the threshold, the more edges will be detected, and the result will be increasingly susceptible to noise and detecting edges of irrelevant features in the image. Conversely, a high threshold may miss subtle edges, or result in fragmented edges.

One approach to handle the problem of appropriate thresholds for thresholding is by using thresholding with hysteresis. This method may use multiple thresholds to find edges. The method begins by using the upper threshold to find the start of an edge. Having determined a start point, the path of the edge may be traced through the image pixel by pixel, marking an edge whenever it is above the lower threshold. Marking the edge may end when the value falls below the lower threshold. This approach may make the assumption that edges are likely to be in continuous curves, and allows an algorithm to follow a faint section of a previously seen edge without mistakenly identifying every noisy pixel in the image as an edge.

Figure 5:
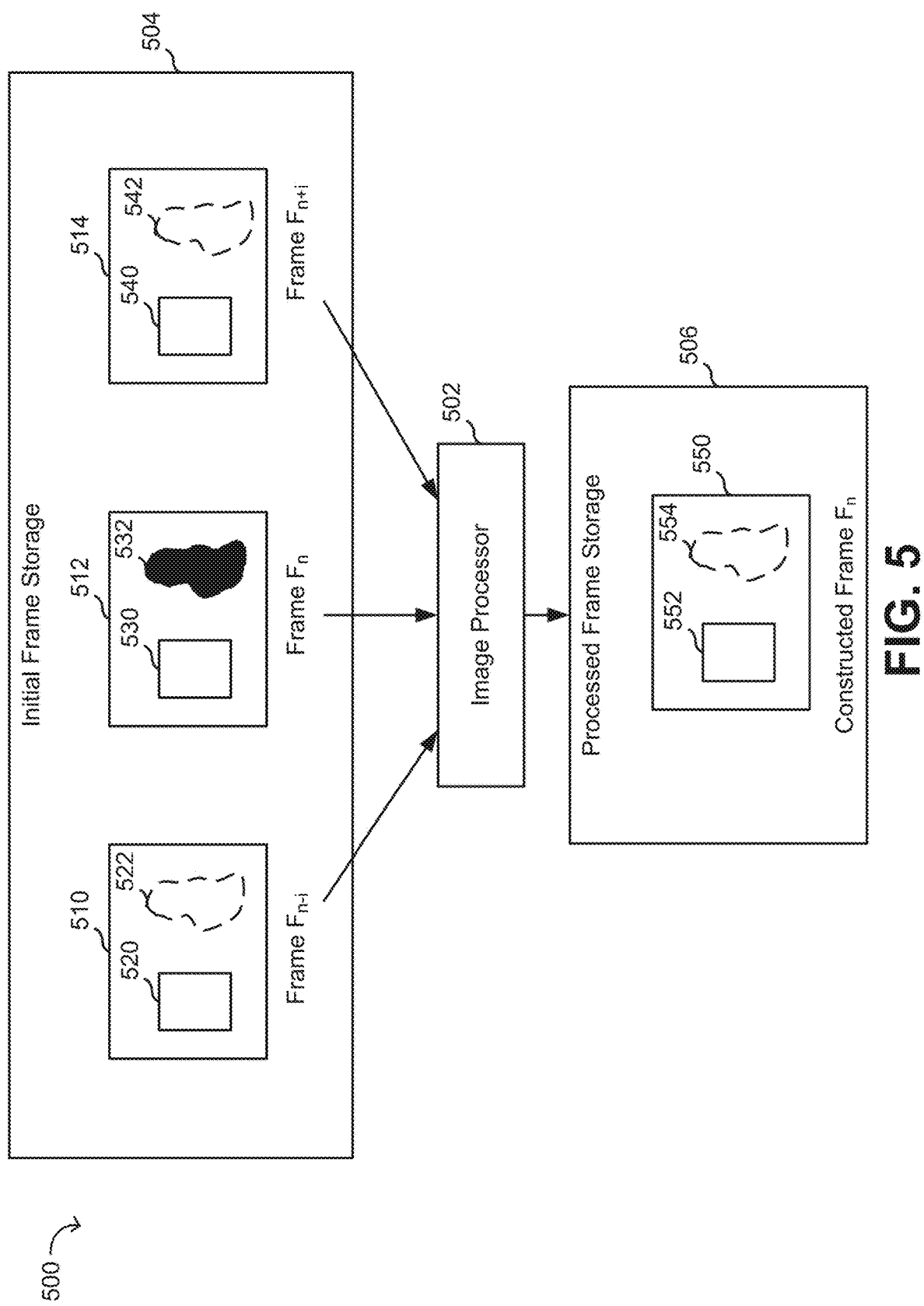
FIG. 5 illustrates an image processor implementing an image processing pipeline in which pixels, in individual frames, corresponding to removed objects, are replaced with pixels from nearby frames.

FIG. 5 illustrates an image processor implementing an image processing pipeline 500 in which pixels, in individual frames, corresponding to removed objects, are replaced with pixels from nearby frames. FIG. 5 illustrates an example of removal of an object occluding a background in accordance with an embodiment. As shown there, an image processor 502 reads in or otherwise obtains frames from an initial frame storage element 504 and outputs a processed frame to a processed frame storage element 506. In some cases, frames are read from storage and processed frames are stored in that same storage. In this example consider that frames 510 and 514 are nearby frames, and frame 512 is a current frame being processed. The image processor 502 might operate on multiple frames and might operate on one frame at a time, the current frame.

An operator might initiate a process of the image processor 502 to replace pixels in the current frame $F_n$ 512 with corresponding pixels from a preceding nearby frame, $F_{n-i}$ 510, or a succeeding nearby frame, $F_{n+i}$ 514. The image processor can then compute a processed constructed frame $F_n$ 550. Although elements in the frames 510, 512, 514 appear similar and well-defined, this need not always be the case.

In generating processed frame 550, the image processor 502 might consider pixels from frame $F_n$ 512 replaced such that the background has been reconstructed from the nearby frames. In the processed frame $F_n$ 550, pixels removed from frame $F_n$ by elimination of the object 532 may be replaced with pixels 522 from preceding frame 510 or pixels 542 from succeeding frame 514, while the object depicted by a rectangle (object 520 in frame 510, object 530 in frame 512, object 540 in frame 514, and object 552 in frame 550) might be unchanged.

A set of nearby frames might be selected from preceding frames and/or succeeding frames based on various criteria. In addition to selecting which frames would constitute the set of nearby frames, a registration process might determine which regions are to be used. A region of a frame might comprise all of the pixels of a frame but more commonly a region would be a smaller set of pixels. A replacement region of a current frame might define which pixels of the current frame, the current frame pixels, are to be replaced or modified based on pixels in corresponding regions of frames in the set of nearby frames. The corresponding frame regions of the nearby frames might be determined using an image registration process, in which two or more images are aligned.

In some embodiments, all nearby frames of the set of nearby frames are given an equal or uniform weight. In other embodiments, different nearby frames might be weighted more than others. In some embodiments, the weights are applied on a frame-by-frame basis, such as where a weight distribution is a weighted average of nearby frames with a given frame's weight being a function of a time difference between the current frame and the given frame. In some embodiments, different pixels in a nearby frame might have differing weights. In yet other embodiments, the weighting options can be user-selected and might provide for some combination of the above. The particular function of the time difference might be a linear function, such as where a weight, W, of a nearby frame that is N frames away from the current frame is defined by $W(N)=AN+B$ where A and B are constants, possibly user-specified. In another example, $W(N)$ follows a Gaussian distribution, with nearer frames being given more weight than distant frames, possibly with some long-tail cut-off to save on processing efforts. Thus, while FIG. 5 depicts only two nearby frames, more than two nearby frames might be used.

The weight used for a given pixel of a corresponding frame region of a nearby frame might be a frame weight of the nearby frame multiplied by (or some other function of) a pixel weight that might vary over the corresponding frame region, as described herein. The variance might be a spatially-varying gain that varies over pixels of the corresponding frame region.

Corresponding frame regions between two frames can be found if the camera projection matrix is known for each frame and the geometry is known and stationary. A frame at time A can be aligned to a frame at time B by projecting the image at time A onto the geometry using the camera projection matrix for A and rendering it through the projection matrix at time B. The geometry can be obtained from a LIDAR scan of the scene or can be approximated by a user inserting approximate geometry into the scene. Alternatively, the frames can be aligned using Optical Flow and warping the frames into place.

Figure 6:
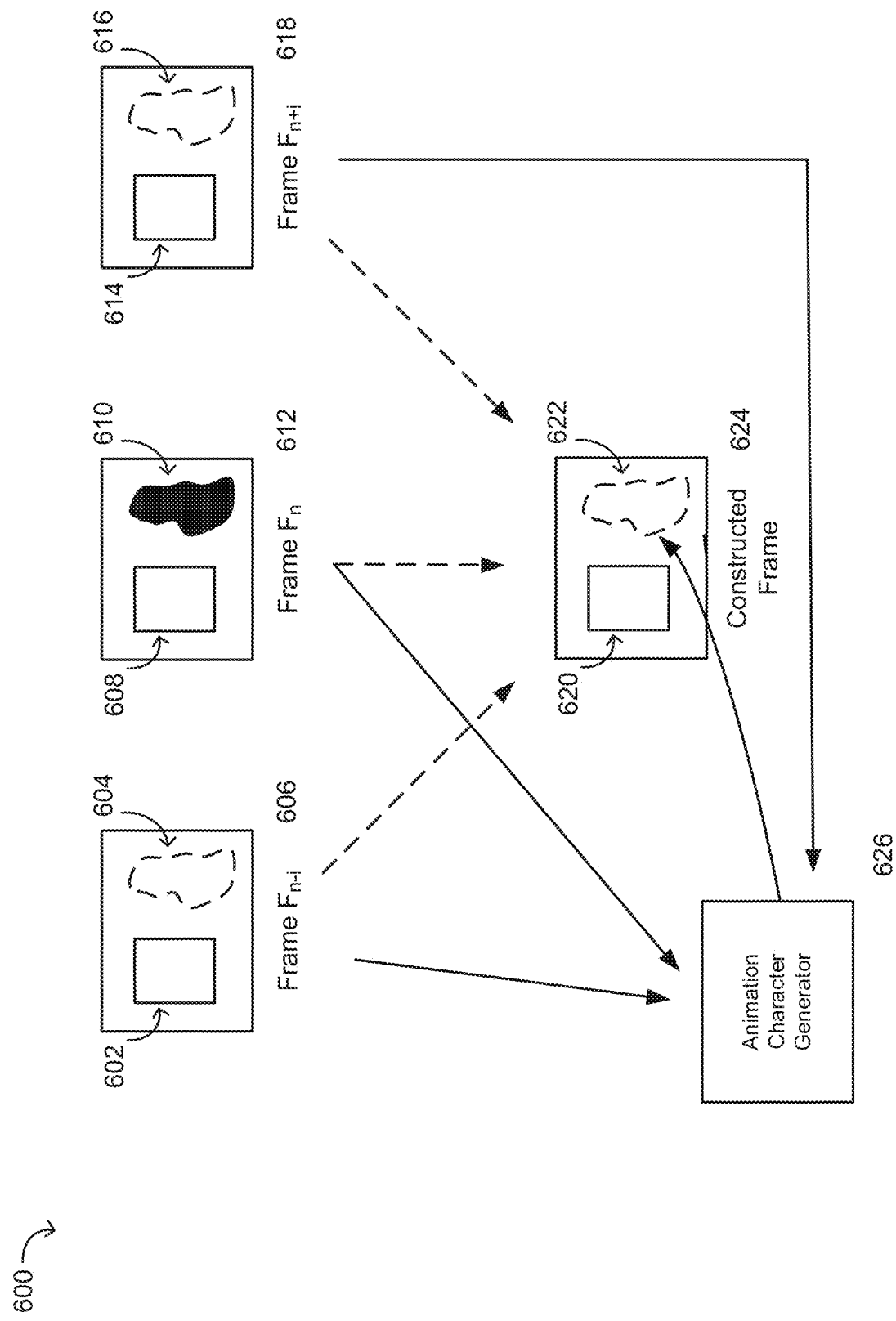
FIG. 6 illustrates an image processing pipeline in which an animation character generator replaces the pixels, of the individual frames, corresponding to the removed objects, with pixels from preceding and succeeding frames.

FIG. 6 illustrates an example of the removal of an object occluding a background in accordance with an embodiment, which might be done by an image processor such as image processor 502. FIG. 6 illustrates a process 600 for removing a selected object from a frame $F_n$ 612 (having objects 608 and 610) whereby pixels from a preceding frame, $F_{n-i}$ 606 (having objects 602 and 604), and a succeeding frame, $F_{n+i}$ 618 (having objects 614 and 616), may serve as inputs to an animation character generator 626 to create a constructed frame $F_n$ 624 (having objects 620 and 622). In the constructed frame $F_n$ 624, pixels removed from frame $F_n$ by elimination of the selected actor 610 are replaced with pixels from a preceding frame 606 or succeeding frame 618.

In an embodiment, an animation character generator may take inputs from a set of frames $F_n$ 612, $F_{n-i}$ 606, and $F_{n+i}$ 618 of a video to remove an object from a frame $F_n$ 612 and produce a constructed frame $F_n$ 624.

The animation character generator 626 may use edge detection to determine the pixels that adequately replace the pixels removed from a frame as a consequence of removing the object. The animation character generator 626 may also examine the brightness and color distribution of the candidate pixels from the preceding and succeeding frames in order to determine one or more replacement pixels. The animation character generator 626 may be implemented by software executing on a computer system (e.g., a computer system 1000 illustrated in FIG. 10).

Figure 7:
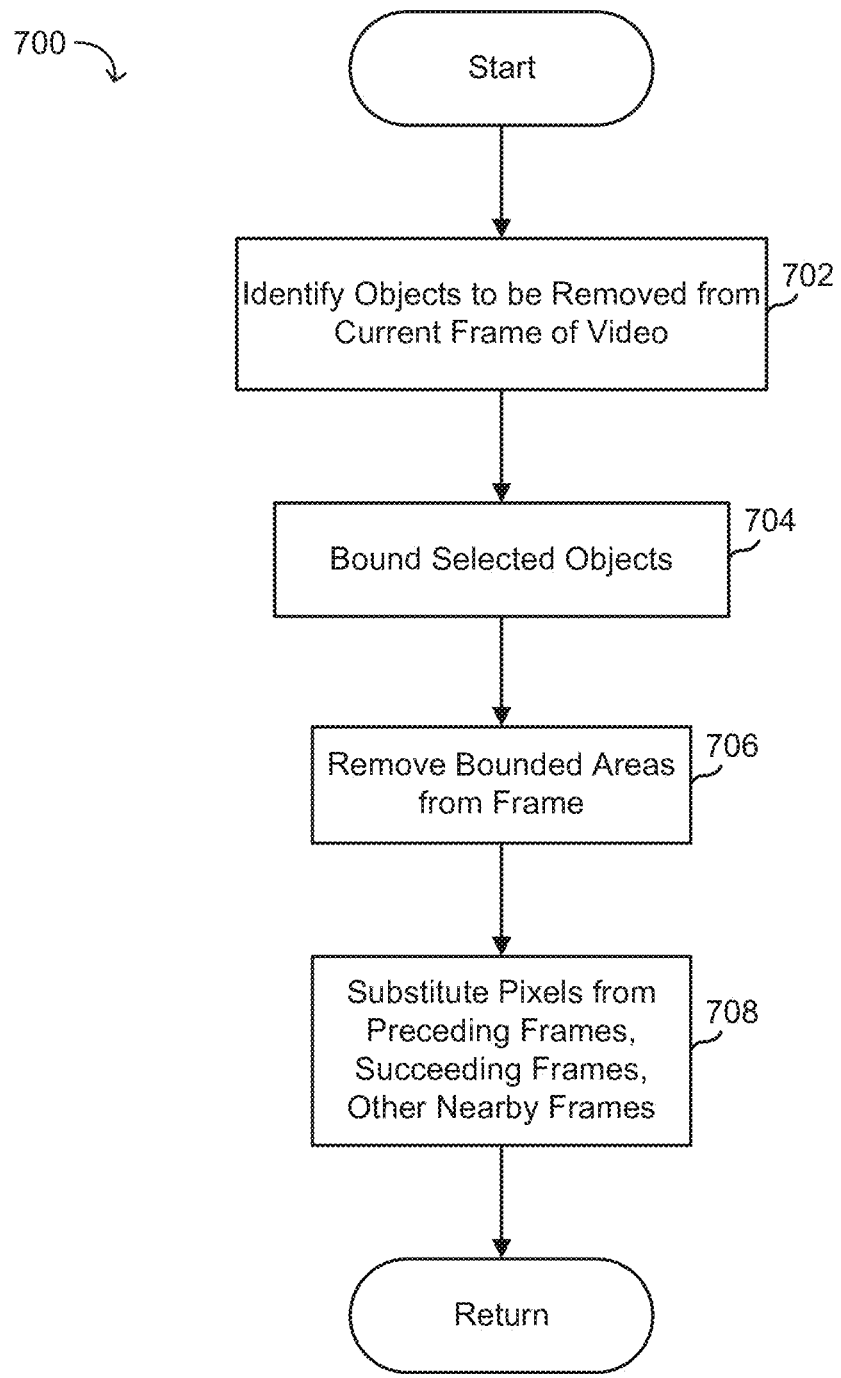
FIG. 7 is a flowchart that shows an example of removing objects and characters from a scene in a video.

FIG. 7 is a flowchart illustrating an example set of operations that an animation character generator might perform to generate a stitched image. Some or all of the process 700 (or any other processes described, or variations and/or combinations of those processes) may be performed under the control of one or more computer systems configured with executable instructions and/or other data, and may be implemented as executable instructions executing collectively on one or more processors (e.g., like the computer system 1000 illustrated in FIG. 10). The executable instructions and/or other data may be stored on a non-transitory computer-readable storage medium (e.g., a computer program persistently stored on magnetic, optical, or flash media). The executable instructions may also be provided carried by a transitory computer readable medium e.g., a transmission medium such as in the form of a signal transmitted over a network.

In step 702, an operator may identify objects to be removed from the frames of the video. This operation might be performed using an interface to a computer application. In one embodiment, rough outlines sometimes referred to as "garbage maps" are used to remove objects. Such rough outlines may be drawn using techniques such as rotoscoping, which is an animation technique that animators may use to trace over video frames. These rough outlines typically extend beyond the edges of all the objects to be removed. This allows the system to begin substitution further away from the edge of the object if switching to a substituted image results in a less abrupt change. If any part of the object is inadvertently left outside the outline it will remain in the final result, or be transferred between images.

In step 704, the selected objects are labeled and, within each frame of the video, the edges of the labeled objects are determined.

In step 706, within each frame of the video, the pixels of the labeled objects are cleared.

In step 708, substitute values for each cleared pixel of each frame are determined, by examining the respective pixels of the preceding and succeeding frames and identifying a set of possible replacement pixels, for example, by determining a weighted distribution of the candidate pixels. A suitable replacement pixel is then substituted into the frame.

In some embodiments, weighting may be determined by process 700 where each pixel refers to neighboring pixels of nearby frames to see how much the particular pixel wants to agree with its neighboring pixels and how much the pixel wants to be another pixel quality based on the quality of the images (e.g., based on distance), for example, the pixel of image 5 is best, but all the neighboring pixels have picked the pixel from image 4. Pixel choice may be truncated at some point within an error threshold.

Where the scene geometry and camera information are known, the quality of a result can be derived from the relative change in scale of the data. For example, a candidate image that comes from a frame where the camera was further from the scene or had a shorter focal length than the target frame will have less detail than a frame with similar distance and focal length, so it will not be as sharp and will be considered lower quality. Frames that have similar viewing angles to the geometry will have higher quality since they will appear similarly stretched. Frames that have a similar motion blur are also considered higher quality. The quality metric may also include any confidence metric derived from the frame alignment process (such as Optical Flow or Structure From Motion errors).

The total cost of using a particular candidate replacement image for a pixel can be computed, in an embodiment, to be a combination of the quality of that image combined with the color difference between the color of the pixel in that candidate image and the color of the pixels currently chosen by the neighbors in the nearby frames. This cost can be computed for each pixel in the output image, using all source images, and the choice updated to whichever source has the lowest combined cost. This process is applied iteratively multiple times. Where the choice for a pixel changes, the costs associated with neighboring pixels will update, which may cause those pixels to change. This process can be terminated after a fixed number of iterations, when the number of pixels that change state is below some threshold, or where the total improvement in cost across the image achieved by each iteration drops below a threshold. The process may be implemented by software executing on a computer system (e.g., a computer system 1000 illustrated in FIG. 10).

Figure 8:
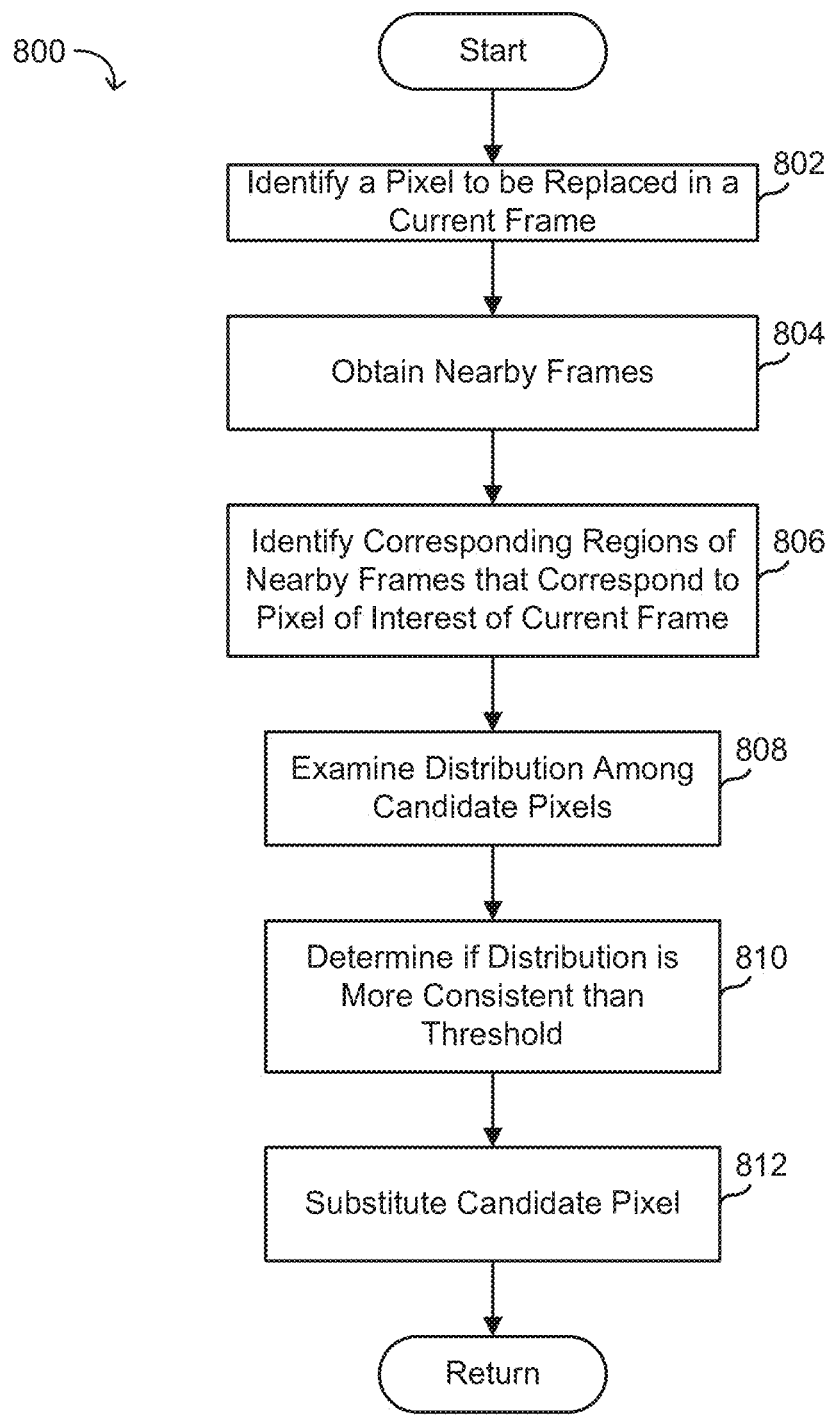
FIG. 8 is a flowchart that shows an example of removing objects and characters from a scene in a video.

FIG. 8 is a flowchart illustrating an example set of operations that an animation character generator might perform to identify a replacement pixel. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). The executable instructions may also be provided carried by a transitory computer readable medium e.g., a transmission medium such as in the form of a signal transmitted over a network.

In step 802, a pixel to be replaced in a current frame of a video is identified.

In step 804, preceding and succeeding frames of the current frames are obtained.

In step 806, within each of the preceding and succeeding frame, pixels are obtained that correspond to the pixel to be replaced (the pixel of interest).

In step 808, the brightness and color distribution of candidate pixels is determined.

In step 810, the weighted distribution of candidate pixels is compared to a threshold to ensure that the replacement pixels will not introduce an extraneous edge or artifact. If they would, those replacement pixels and their corresponding frame regions might be labeled as excludable corresponding frame regions.

In step 812, the pixel of interest is replaced with a candidate pixel.

Figure 10:
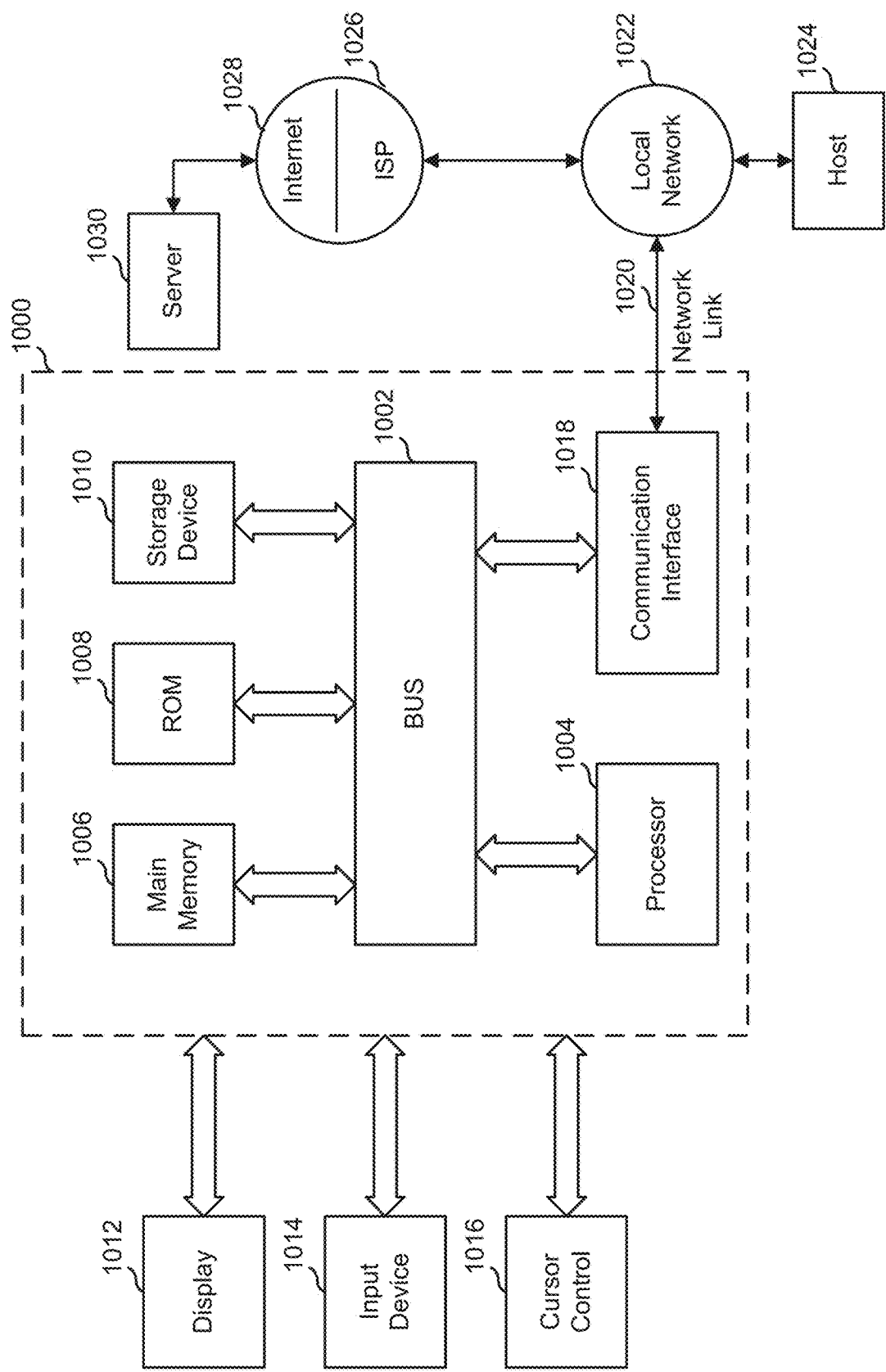
FIG. 10 is a block diagram illustrating a computer system upon which computer systems of the system illustrated in FIG. 9 may be implemented.

The various embodiments further can be implemented in a wide variety of operating environments, which in some cases can include one or more user computers, computing devices or processing devices that can be used to operate any of a number of applications (e.g., a computer system 1000 illustrated in FIG. 10). Such a system also can include a number of workstations running any of a variety of commercially available operating systems and other known applications. These devices also can include virtual devices such as virtual machines, hypervisors and other virtual devices capable of communicating via a network.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Operations of processes described herein can be performed in any suitable order unless otherwise indicated herein or otherwise clearly contradicted by context. Processes described herein, such as the process 700 (see FIG. 7), (or variations and/or combinations thereof) may be performed under the control of one or more computer systems (e.g., the computer system 1000) configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program including a plurality of instructions executable by one or more processors. The computer-readable storage medium may be non-transitory.

Figure 9:
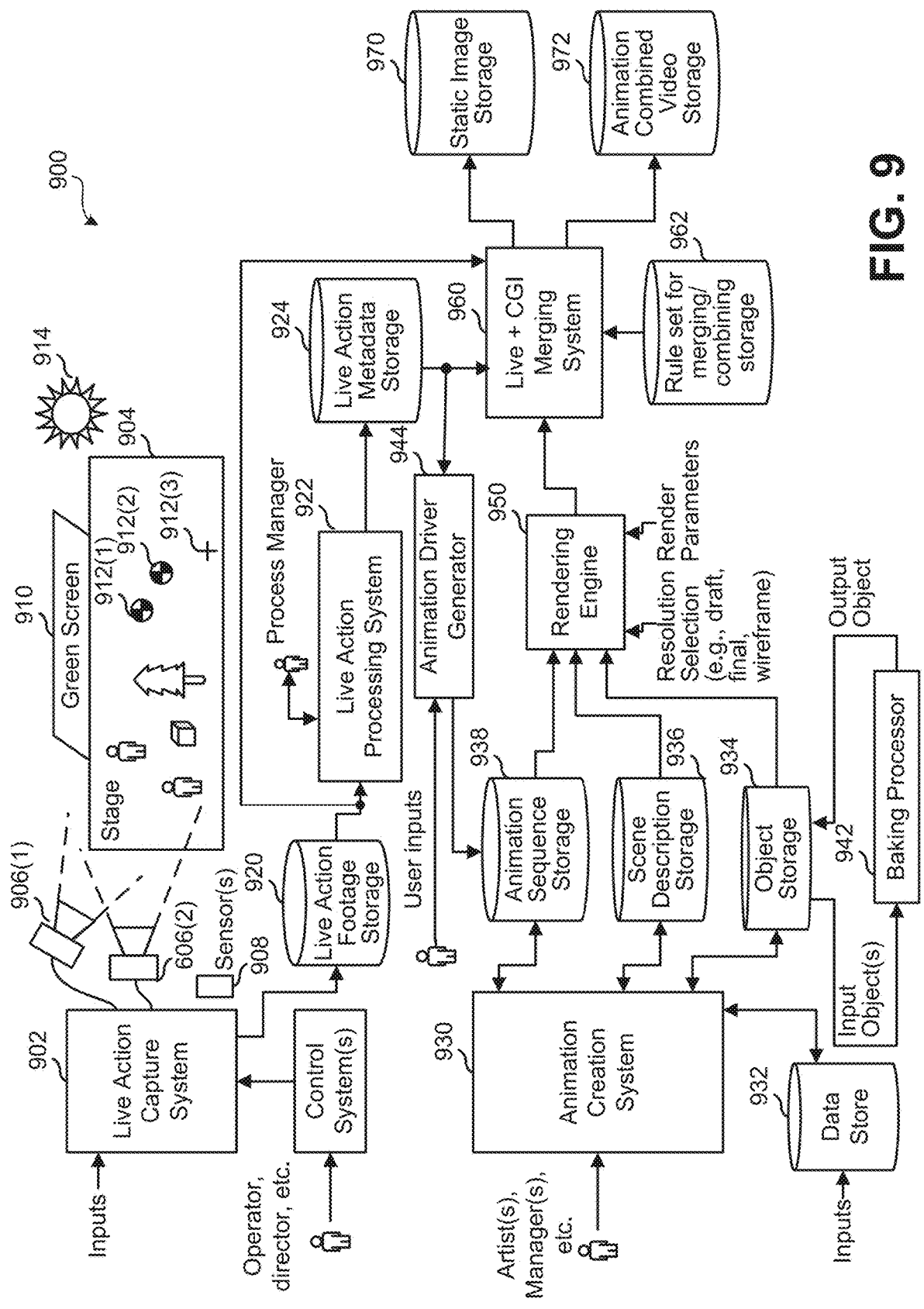
FIG. 9 illustrates an example of visual content generation system as might be used to generate imagery in the form of still images and/or video sequences of images.

For example, FIG. 9 illustrates the example visual content generation system 900 as might be used to generate imagery in the form of still images and/or video sequences of images.

The visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows. Images might or might not be stored in a compressed format, but either way, a desired image may be represented as a two-dimensional array of pixel color values. In another variation, images are represented by a pair of stereo images for three-dimensional presentations and in other variations, some of the image output, or all of it, might represent three-dimensional imagery instead of just two-dimensional views. The output frames that result from such processing might be stored as a processed video sequence wherein pixels of regions of interest in various frames are replaced with replacement pixels and replacement image portions computed as described herein.

A stored video sequence might include a plurality of images such as the still images described herein, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 might be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor 942 that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene. The animation driver generator 944 might generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from rulesets for merging/combining storage 962. A very simple example of a rule in a ruleset might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium and/or carrier medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 10 is a block diagram that illustrates a computer system 1000 upon which the computer systems of the systems described herein and/or the visual content generation system 900 (see FIG. 9) may be implemented. The computer system 1000 includes a bus 1002 or other communication mechanism for communicating information, and a processor 1004 coupled with the bus 1002 for processing information. The processor 1004 may be, for example, a general-purpose microprocessor.

The computer system 1000 also includes a main memory 1006, such as a random-access memory (RAM) or other dynamic storage device, coupled to the bus 1002 for storing information and instructions to be executed by the processor 1004. The main memory 1006 may also be used for storing temporary variables or other intermediate information during execution of instructions to be executed by the processor 1004. Such instructions, when stored in non-transitory storage media accessible to the processor 1004, render the computer system 1000 into a special-purpose machine that is customized to perform the operations specified in the instructions.

The computer system 1000 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions.

The computer system 1000 may be coupled via the bus 1002 to a display 1012, such as a computer monitor, for displaying information to a computer user. An input device 1014, including alphanumeric and other keys, is coupled to the bus 1002 for communicating information and command selections to the processor 1004. Another type of user input device is a cursor control 1016, such as a mouse, a trackball, or cursor direction keys for communicating direction information and command selections to the processor 1004 and for controlling cursor movement on the display 1012. This input device typically has two degrees of freedom in two axes, a first axis (e.g., x) and a second axis (e.g., y), that allows the device to specify positions in a plane.

The computer system 1000 may implement the techniques described herein using customized hard-wired logic, one or more ASICs or FPGAs, firmware and/or program logic which in combination with the computer system causes or programs the computer system 1000 to be a special-purpose machine. According to one embodiment, the techniques herein are performed by the computer system 1000 in response to the processor 1004 executing one or more sequences of one or more instructions contained in the main memory 1006. Such instructions may be read into the main memory 1006 from another storage medium, such as the storage device 1010. Execution of the sequences of instructions contained in the main memory 1006 causes the processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 1010. Volatile media includes dynamic memory, such as the main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1002. Transmission media can also take the form of acoustic or light waves, such as those generated during radio-wave and infra-red data communications.

Various forms of media may be involved in carrying one or more sequences of one or more instructions to the processor 1004 for execution. For example, the instructions may initially be carried on a magnetic disk or solid-state drive of a remote computer. The remote computer can load the instructions into its dynamic memory and send the instructions over a network connection. A modem or network interface local to the computer system 1000 can receive the data. The bus 1002 carries the data to the main memory 1006, from which the processor 1004 retrieves and executes the instructions. The instructions received by the main memory 1006 may optionally be stored on the storage device 1010 either before or after execution by the processor 1004.

The computer system 1000 also includes a communication interface 1018 coupled to the bus 1002. The communication interface 1018 provides a two-way data communication coupling to a network link 1020 that is connected to a local network 1022. For example, the communication interface 1018 may be a network card, a modem, a cable modem, or a satellite modem to provide a data communication connection to a corresponding type of telephone line or communications line. Wireless links may also be implemented. In any such implementation, the communication interface 1018 sends and receives electrical, electromagnetic, or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP) 1026. The ISP 1026 in turn provides data communication services through the world-wide packet data communication network now commonly referred to as the "Internet" 1028. The local network 1022 and Internet 1028 both use electrical, electromagnetic, or optical signals that carry digital data streams. The signals through the various networks and the signals on the network link 1020 and through the communication interface 1018, which carry the digital data to and from the computer system 1000, are example forms of transmission media.

The computer system 1000 can send messages and receive data, including program code, through the network(s), the network link 1020, and communication interface 1018. In the Internet example, a server 1030 might transmit a requested code for an application program through the Internet 1028, ISP 1026, local network 1022, and communication interface 1018. The received code may be executed by the processor 1004 as it is received, and/or stored in the storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing images, the method comprising:
    determining, for a current frame of a plurality of frames, a pixel of interest to be replaced;
    obtaining from the plurality of frames, a set of nearby frames;
    identifying from the set of nearby frames, a set of pixels corresponding to the pixel of interest, wherein candidate pixels of the set of pixels are determined based on a geometric alignment of the set of nearby frames with the current frame;
    determining a weight for candidate pixels of the set of pixels as a frame weight of a nearby frame of the set of nearby frames, multiplied by a pixel weight that varies over the set of pixels such that at least some of the candidate pixels in the set of pixels have different weights;
    based, at least in part, on determining the weight, determining a replacement pixel; and
    generating a stitched image from the current frame, wherein the pixel of interest is replaced with the replacement pixel.

2. The computer-implemented method of claim 1, further comprising:
    determining, for a second image, a spatially-varying gain, wherein the spatially-varying gain varies over pixels of the second image.

3. The computer-implemented method of claim 1, wherein the geometric alignment comprises processing a camera projection matrix for each frame.

4. The computer-implemented method of claim 3, wherein the camera projection matrix is obtained from a LIDAR scan of a scene.

5. The computer-implemented method of claim 1, wherein the geometric alignment comprises aligning using optical flow and warping the frames into position.

6. The computer-implemented method of claim 1, wherein the geometric alignment comprises using projections based on approximate geometry and camera parameters.

7. A non-transitory carrier medium carrying image data that includes pixel values generated according to the method of claim 1.

8. A non-transitory computer-readable storage medium storing instructions, which when executed by at least one processor of a computer system, causes the computer system to perform operations comprising:
    determining for a current frame of a plurality of frames, a pixel of interest to be replaced;
    obtaining from the plurality of frames, a set of nearby frames;
    identifying from the set of nearby frames, a set of pixels corresponding to the pixel of interest, wherein candidate pixels of the set of pixels are determined based on a geometric alignment of the set of nearby frames with the current frame;
    determining a weight for candidate pixels of the set of pixels is a frame weight of a nearby frame of the set of nearby frames, multiplied by a pixel weight that varies over the set of pixels such that at least some of the candidate pixels in the set of pixels have different weights;
    based, at least in part, on determining the weight, determining a replacement pixel; and
    generating a stitched image from the current frame, wherein the pixel of interest is replaced with the replacement pixel.

9. A computer system for processing digital video, the computer system comprising:
    at least one processor; and a computer-readable medium storing instructions, which when executed by the at least one processor, causes the computer system to perform operations comprising:

determining for a current frame of a plurality of frames, a pixel of interest to be replaced;

obtaining from the plurality of frames, a set of nearby frames, wherein the current frame is from a first camera and the set of nearby frames is from a second camera;

identifying from the set of nearby frames, a set of pixels corresponding to the pixel of interest, wherein candidate pixels of the set of pixels are determined based on a geometric alignment of the set of nearby frames with the current frame;

computing a cost of the set of pixels, wherein the cost comprises a combination of:

a quality of the set of pixels based, at least in part, on similarity of at least one of:

focal length of the first camera and focal length of the second camera, or motion blur of the current frame from the first camera and motion blur of the nearby frames from the second camera; and a color difference between a color of a candidate replacement pixel of the set of pixels and colors of pixels in the set of nearby frames;

a result of computing the cost of the set of pixels, determining a replacement pixel; and generating a stitched image from the current frame, wherein the pixel of interest is replaced with the replacement pixel.

10. The computer-implemented method of claim 9, wherein computing of the cost of the set of pixels is performed iteratively to determine a potential replacement pixel for the pixel of interest with each iteration, and when the potential replacement pixel changes with an iteration, a cost associated with at least one neighboring pixel of the pixel of interest, updates resulting in replacement pixels for the neighboring pixel to change.

* * * * *